Sept. 29, 1925.

E. W. KNOBLAUCH

MIXING SPOON

Filed Oct. 8, 1923

INVENTOR.
Edward W. Knoblauch

Patented Sept. 29, 1925.

1,555,502

UNITED STATES PATENT OFFICE.

EDWARD W. KNOBLAUCH, OF METAMORA, ILLINOIS.

MIXING SPOON.

Application filed October 8, 1923. Serial No. 667,193.

*To all whom it may concern:*

Be it known that I, EDWARD W. KNOB-LAUCH, a citizen of the United States, residing at Metamora, in the county of Woodford and State of Illinois, have invented certain new and useful Improvements in Mixing Spoons, of which the following is a specification.

This invention relates to improvements in mixing spoons and particularly that type of mixing spoon adapted to be used in mixing cake batter.

An important object of the invention is to provide a spoon which will freely mix the batter and make the admission of air possible.

A further object of the invention is to provide a mixing spoon which is simple and durable of construction and inexpensive to manufacture.

Other objects and advantages of this invention will be apparent during the course of the following description.

In the accompanying drawing forming a part of this specification and in which like numerals are employed to designate like parts through the same:

Figure 1:
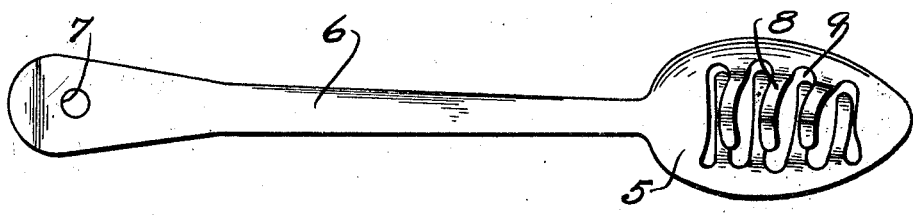
Figure 1 is a plan view of the device.
Figure 2:
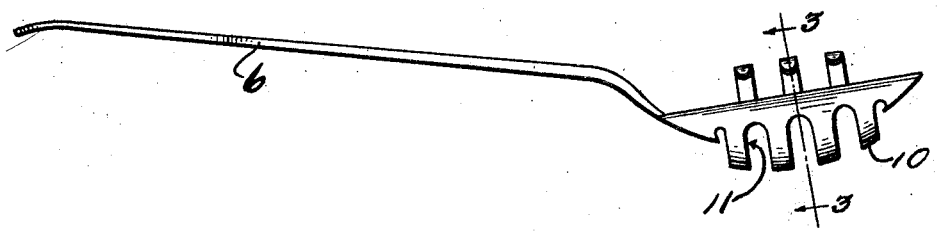
Figure 2 is a side elevation of same.
Figure 3:
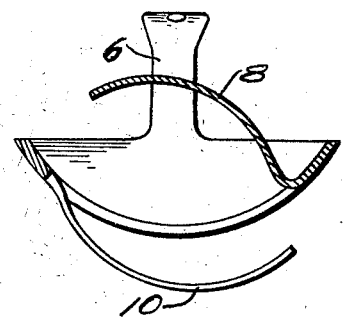
Figure 3 is a transverse sectional view taken on line 3—3 of Figure 2.

In the drawing, wherein for the purpose of illustration is shown the preferred embodiment of my invention, the numeral 5 generally designates a spoon, which is preferably somewhat larger than a table spoon and equipped with the usual handle member 6, having an opening 7 therein for hanging on a nail or the like. The center of the spoon has a plurality of upwardly extending curved fingers 8 which are provided with spaces 9 therebetween to permit the passage of the dough or the like. The opposite side of the spoon has a plurality of downwardly curved fingers 10 arranged in spaced relation with the aforementioned fingers 8 and having suitable spaces 11 therebetween.

In use, as the spoon is rotated in the usual manner within the batter, the fingers serve to agitate same, but permit a certain amount flowing therebetween in such a manner as to thoroughly mix the batter and permit the access of air thereto. While there are many devices for this purpose on the market, it is thought that the herein described device possesses advantages over those now in use inasmuch as the position assumed by the fingers and the spaced relation thereof produce a mixing spoon heretofore unequalled.

It is to be understood that the form of my invention herewith shown and described is to be taken as the preferred example of the same, and that various changes in the shape, size, and arrangement of parts may be resorted to without departing from the spirit of my invention, or the scope of the subjoined claims.

Having thus described my invention, I claim:

1. A mixing spoon of the character described comprising a plurality of upwardly and downwardly curved fingers in staggered relation with one another.

2. A mixing spoon having a plurality of upwardly and downwardly curved fingers in staggered relation with one another and disposed transversely across the bowl portion of the spoon.

3. A mixing spoon having a plurality of upwardly and downwardly curved fingers in staggered relation with one another and disposed transversely across the bowl portion of the spoon and the fingers being spaced from each other thereby providing an opening opposite each finger and through the bowl portion of the spoon.

In testimony whereof, I have affixed my signature.

EDWARD W. KNOBLAUCH.